Nov. 7, 1944.　　O. F. REITER　　2,362,402
STONE PICKING MACHINE
Filed May 19, 1942　　3 Sheets-Sheet 1
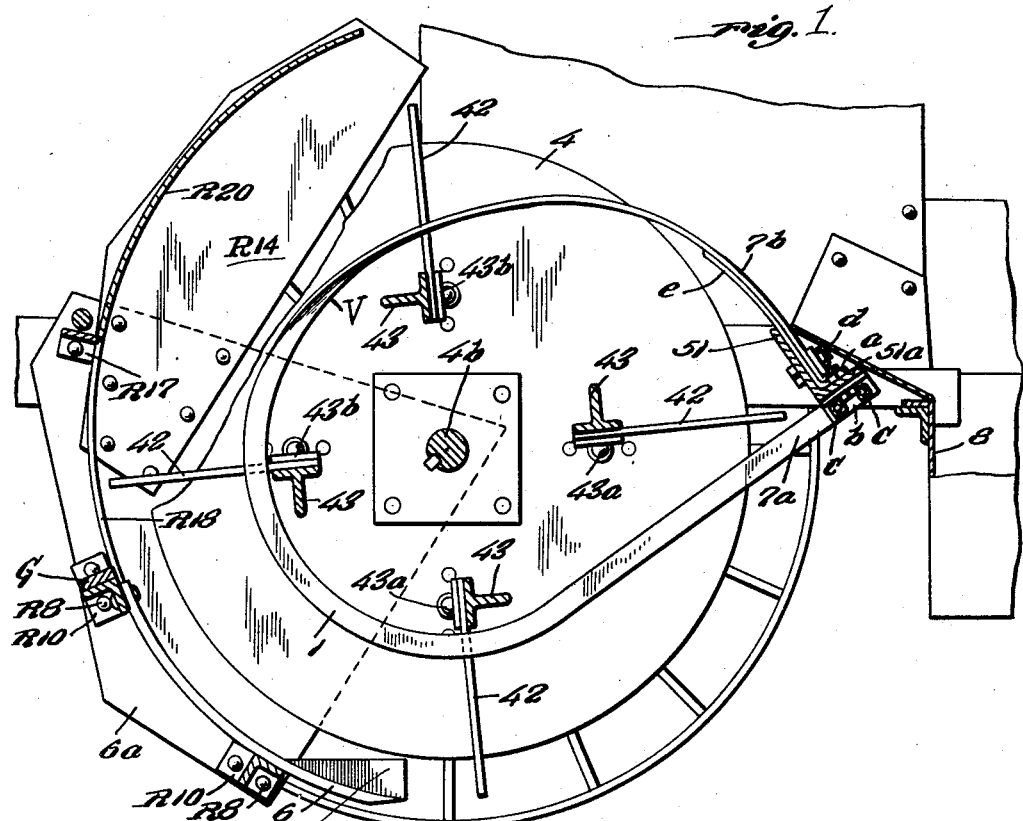
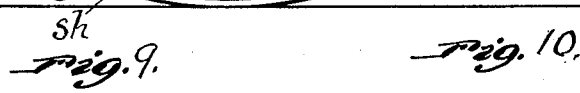
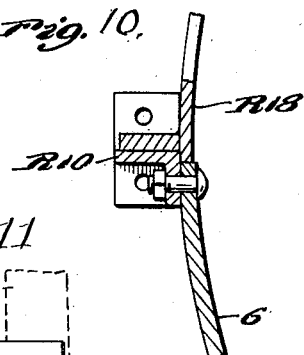
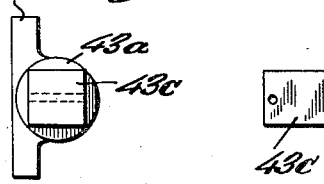
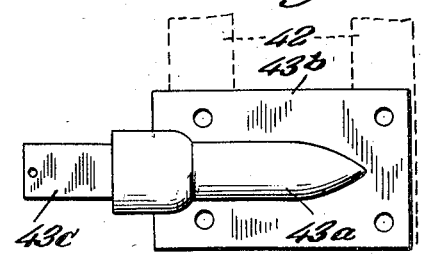
Inventor
Otis F. Reiter
By Spear, Donaldson + Hall
Attorneys Nov. 7, 1944.   O. F. REITER   2,362,402
STONE PICKING MACHINE
Filed May 19, 1942   3 Sheets-Sheet 2
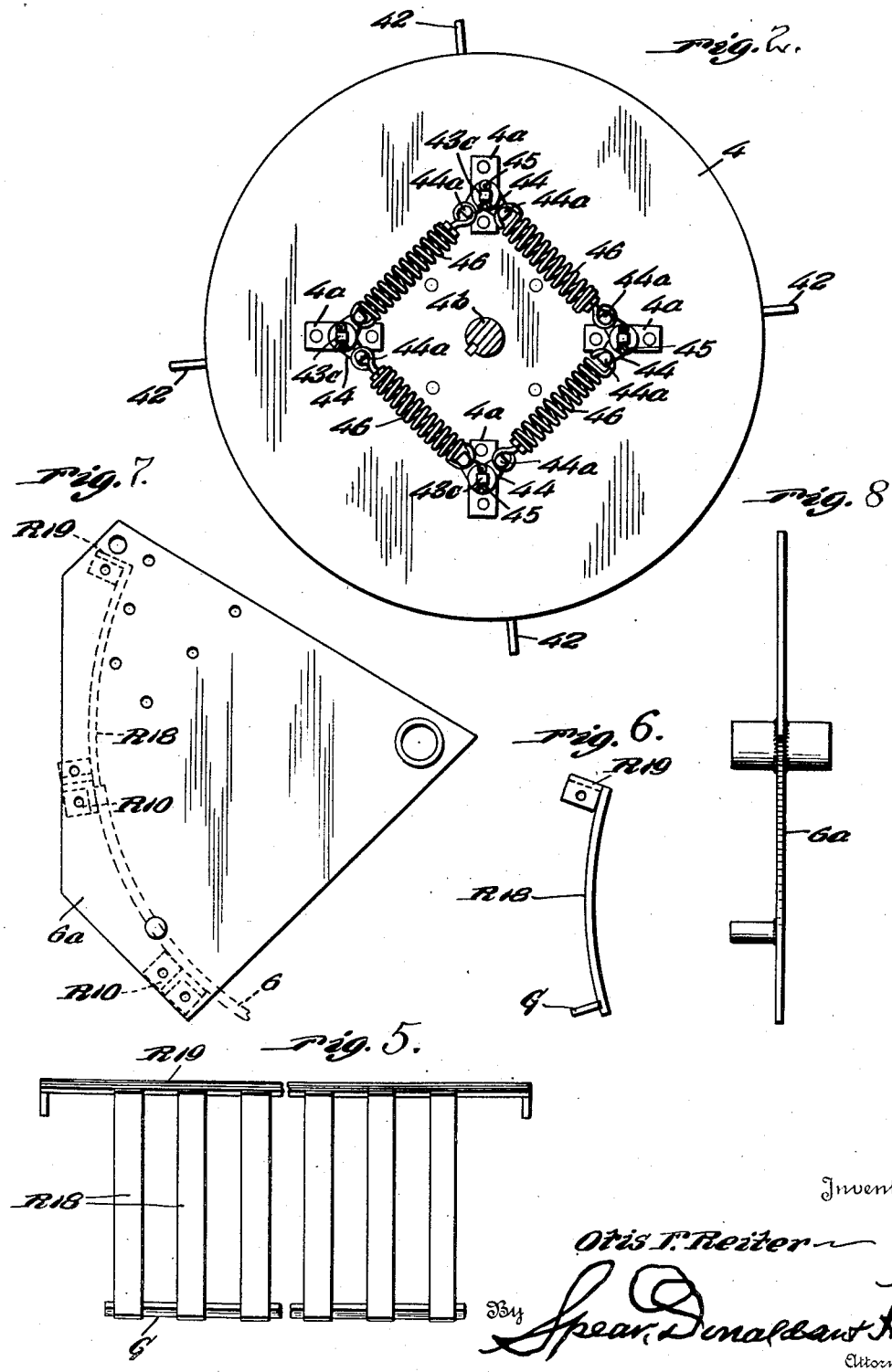

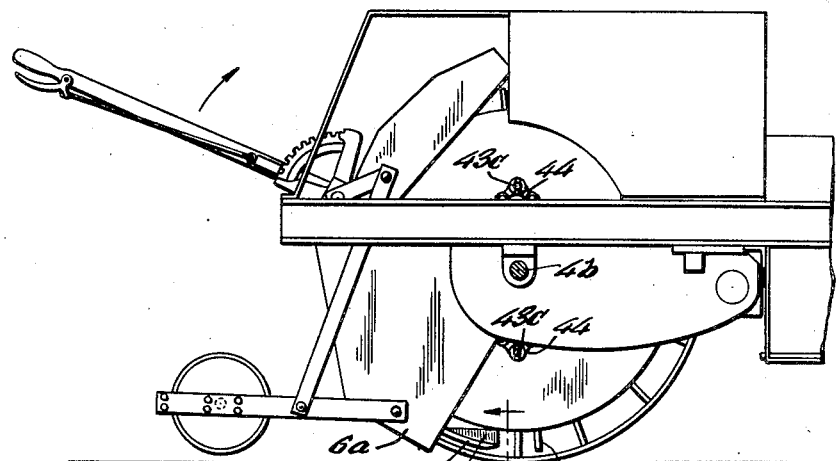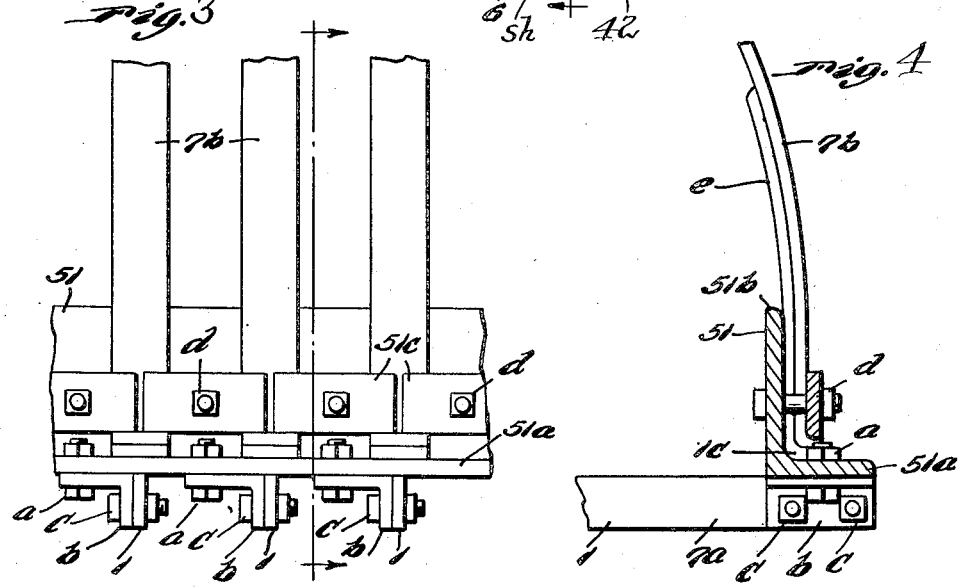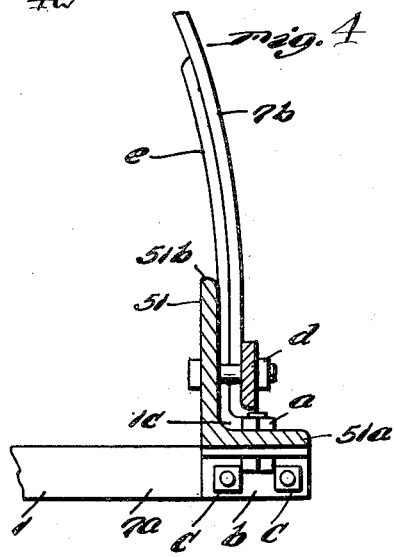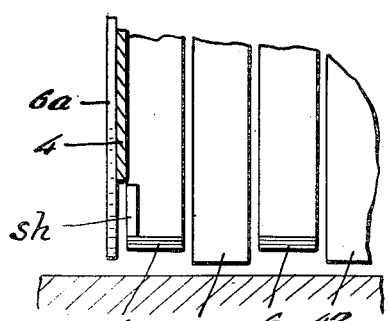

Patented Nov. 7, 1944

2,362,402

UNITED STATES PATENT OFFICE 2,362,402

STONE PICKING MACHINE

Otis F. Reiter, Baltimore, Md., assignor to Fastpic Corporation, Baltimore, Md., a corporation of Maryland Application May 19, 1942, Serial No. 443,619

7 Claims. (Cl. 55—17)

The invention relates to the general form of stone picker disclosed in Letters Patent of the United States No. 2,141,557 granted to me Dec. 27, 1938 and Letters Patent No. 2,213,370 granted to me Sept. 3, 1940.

The invention consists in the features and combination and arrangement of parts hereinafter described and particularly pointed out in the claims.

In the accompanying drawings

Figure 1 is a central vertical sectional view from front to rear of the reel having stone lifting arms, and showing in side elevation conveyor or track bars for directing the stones to a point of delivery when advanced by the lifting arms.

Fig. 2 is a side view of a spring and lever mechanism for stressing the rock shafts which carry stone lifting arms.

Fig. 3 is a front view of a cross bar, constituting a part of the main frame of the machine, together with the means for attaching conveyor bars thereto.

Fig. 4 is a side view partly in section of parts shown in Fig. 3.

Fig. 5 is a front view of a removable grill to occupy a position to prevent stones from flying out of their prescribed course.

Fig. 6 is a side view of Fig. 5.

Fig. 7 is a side view of one of quadrant plates which carry the rake and the removable grill.

Fig. 8 is an edge view of Fig. 7.

Fig. 9 is a view of the angle bar which carries the rake teeth.

Fig. 10 is a view of the bar of Fig. 9 showing a part of one of the rake teeth and a part of the removable grill associated with the angle bar.

Fig. 11 is a front view of the trunnion of the rock shaft of the reel.

Fig. 12 is an end view of Fig. 11.

Fig. 13 is a side view of part of the machine.

Fig. 14 is a detail view looking at the front ends of the rake bars, the shield sh, part of the reel 4 and part of the stone lifting arms.

As in said patent above mentioned, the machine includes a rotary reel made up of discs 4 mounted on a shaft 4b. The reel has stone picker or lifting arms or tines 42 which cooperate with a rake organization, having teeth 6 which take the stones from the ground to be contacted by the lifting arms and carried forward thereby along the track or conveyor bars 1 which are spaced apart from each other and which deliver the stones into a hopper or receptacle in front of said reel and indicated generally at 8.

The reel may be driven to rotate constantly while the machine is in operation by mechanism like that disclosed in the patent aforesaid.

In the present machine the stone lifting arms are mounted in spaced apart relation on rock shafts 43 which in cross section are of T shape. These rock shafts extend across the space between the discs 4 of the reel and they have journals 43a mounted in suitable bearings 4a on the outer sides of the discs 4 of the reel. These journals project through the bearings and have ends 43c which are rectangular in cross section and receive two armed levers 44 held in place by a cotter pin 45. These bell crank levers have projections or hook shaped members 44a to receive and hold the ends of helical springs 46. There are four sets of the stone lifting arms 42 and four rock shafts 43 and the latter are distributed one for each set of arms and these rock shafts are spaced around the reel shaft 4b at equal distances apart and at equal distances from the said reel shaft.

The springs 46, of which there are four on each disc, extend each from one bell crank lever 44 to the next adjacent bell crank lever. These springs are normally under tension and they normally hold the rock shafts in position with their respective stone lifting arms extending substantially radially of the axis of rotation of the reel disc.

The axes of the journals 43a of the rock shaft 43 are displaced relative to the substantially radial planes in which the lifting arms lie, said displacement being forwardly of said planes in the direction of rotation of the reel. This results in such an offset relation of the lifting arm relative to the center of the rock shaft that as soon as the lifting arm strikes an obstruction it begins to turn about the center of its rock shaft and the arc described by the end of the arm contacting the obstruction will begin to move inwardly in respect to the reel and therefore it will move away from the obstruction and will be free from said obstruction more quickly than if the end of the arm described a path first in an outward direction from the reel and hence would be forced into stronger contact with the obstruction even though at a slightly later period of its movement it would begin to move inwardly of the reel and hence gradually withdraw from contact with the obstruction.

Briefly stated, the arrangement and action is such that as soon as the lifting arm strikes an obstruction that it cannot move, it begins to describe a path in a direction away from the obstruction because when the lifting arm is in normal position it lies in a radial plane in rear of the center of rotation of the shaft in respect to the general direction of travel of the machine. In other words the lifting arm when swinging rearwardly relative to the forward movement of the machine will describe a path in an inward direction in respect to center of the machine and thus will move away from the obstruction both rearwardly and also inwardly of the reel.

It will be observed that no shock absorber device is employed in connection with the lifting arms to take the shock when an arm which has been moved or stressed by contact with an obstruction is released from said contact and is restored to its original position under spring pressure.

Should the lifting arm strike an obstruction in such manner that it should yield in a forward direction the arrangement of springs interconnecting with the series of shafts will allow this forward yielding movement to take place. In other words the rock shafts under the arrangement of the springs above described are free to turn from normal position either forwardly or backwardly if and when any lifting arm strikes an obstruction.

The springs normally, or when at rest, are under a tension of substantially fifty pounds, which is enough to hold the stone lifting arm in normal position so that it will begin transporting the stones of the size that the machine is intended to pick up and advance them towards a point of delivery into a hopper. The arms of the bell cranks 44 are of equal length and are substantially 90° apart. When this mechanism is at rest the springs are axially in line with the center lines of these arms which center lines extend through the centers of the journals of the rock shafts 43. With the mechanism at rest the springs hold the bell cranks in such position so that the lifting arms carried by said rock shafts lie in extended position to contact with and impel any stone lying in its path and of a size that can be picked up by the arm and transported.

If the stone or obstruction is too large or too heavy to be picked up by the arm then the appropriate springs will yield and allow the contacting arm to yield and pass the obstruction, whereupon the arm will be restored to its extended or working position by the said appropriate springs ready to perform its function when it strikes a stone or other object of a size and weight to be carried along and lifted by the arm. When any spring receives the extra stress of an arm striking an obstruction it will be noticed that said spring will stretch, but as this stress is exerted axially and therefore in a direction coinciding with the center line of that arm of that bell crank lever which temporarily is anchoring the spring, this last mentioned bell crank will not turn and hence extra stress will not be transmitted to said bell crank and to the next spring. What has been said of the one spring connected with the bell crank on the rock shaft of the lifting arm being moved also applies to the spring connected with the other arm of the bell crank on the rock shaft of the said lifter arm being moved i. e. said last mentioned spring is itself tensioned but its tension increase is not transmitted in a material degree to the bell crank which acts as an anchor for said last mentioned stressed spring.

This series of springs and bell cranks are on the outer side of the discs constituting the main elements of the reel which carries the rock shafts and desirably there are a set of these springs with their bell cranks located at each side of the machine on the journals 43a which extend through the side discs 4 of the reel and receive the bell cranks on their outer ends.

With the above arrangement no stop means is necessary to arrest the rock shafts or the picker arms to determine the normal position of the rock shafts and the lifting arms carried thereby, because the springs will restore themselves to normal position and in doing so will restore the bell crank rock shafts and stone lifting arms. The springs are of such strength that they will hold the lifting arms in normal position to pick up and push the stones along the conveyor bars to the point where they will pass into a suitable hopper at the front of the machine. If a stone too heavy or too deeply embedded in the ground is encountered the springs will yield and allow the lifting arm to pass this obstruction.

The stone lifting arms move in the spaces between the conveyor or stone directing bars 1 which are supported at their front ends from an L-shaped angle iron 51 forming a part of the frame of the machine. It extends across the machine and is connected to and supported by side bars forming parts of the machine frame. The upper stretch of said conveyor bars are arranged flatwise, that is to say, with their broad upper surfaces facing upwardly and their side edges facing laterally so that broad surfaces are afforded for the stones to rest upon while being forced along said bars by the lifting arms 42. These conveyor or track bars are of strap metal and the lower portions are set up on edge with their broad surfaces facing laterally and their edges facing upwardly and downwardly.

These lower portions have comparatively wide spaces between them so that dirt and trash may fall therethrough to the ground. These upper and lower portions of the conveyor or track bars are formed in one piece with each other and the part where they are twisted at V is of considerable lengthwise extent, to avoid the presence of abrupt shoulders against which the lifting arms might strike and be damaged. The twist at V is the only one in the conveyor bar.

The lower stretches of the conveyor bars which are set up on edge with their flat sides facing laterally of the machine continue in this position and form to their ends which are connected to the frame bar 51. For making this connection the frame bar 51 has bolted at a to its base flange 51a a depending right angular iron plate or bracket b to which is bolted at c the front end of the lower stretch of the conveyor bar which front end marked 7a remains set up vertically on edge and constitutes an extension of the lower stretch of said conveyor or guide bar, without bend or twist at or near this forward point of support of said bar.

These conveyor bars are intended to have yielding movement to avoid clogging of the material being advanced along them by the stone lifting and propeller arms 42. They are supported therefor only at their forward ends and this contributes to their capacity to yield and to have a measure of movement or vibration which will free them from accumulations of material thereon, it being possible for adjacent bars to separate sufficiently to free themselves of clogged material.

The upper stretches 7b of the conveyor or track bars being arranged flatwise, i. e. with their edges directed laterally are adapted to be attached at their forward ends to the upstanding flange 51b of the frame bar 51 and this connection can be made without abruptly bending said stretch 7b and for the purpose also of receiving the front end of the lower stretch 7a in slightly inclined position, said cross bar 51 is arranged at an inclination to a horizontal plane. The forward ends of the upper stretches 7b of the conveyor bars lie against the front side of the backwardly inclined flange 51b of the frame bar 51 and clamping plates 51c bear on these forward ends of the conveyor bars where they are secured by bolts d, it being noted that each clamp holds the forward ends of two adjacent conveyor bars, by bridging the space between said bars and bearing on the margins thereof. The lower terminal portions of the upper stretches 7b are turned forwardly at 1c and the clamping plates 51c overlie and engage these turned ends.

The forward ends of the upper stretches of the conveyor bars may be strengthened by members e in the form of metal strips clamped between the forward ends of the bars and the upper flange 51b of the cross bar 51.

The journals 43a of the rock shafts 43 are formed each with a base plate 43b which is secured to the said rock shaft with two or more of the lifting arms 42 between.

Rake teeth 6 cooperate with the stone lifting arms 42 to direct the stones upwardly from the ground and thence in a forward direction when elevated.

Rake organization

The rake organization includes quadrants 6a, one at each side of the machine consisting of metal plates of generally triangular form mounted loosely on the main axle 4b and adjustable thereabout as will be made clear. Angle iron members R10—R10 extend between and are attached at their ends to these quadrant members by bolts at R8.

These angle iron cross pieces serve to connect the two side plates of the quadrant organization to make a strong structure for supporting the rake teeth and for adjusting the same relative to the ground.

The rake teeth 6 are firmly secured to the angle iron cross pieces R10 in any suitable way, and they curve downwardly and forwardly so that the stones will be engaged thereby and guided upwardly when the same are lifted and propelled by the lifting arms 42 of the reel. The rake teeth are spaced apart from each other so that dirt will pass between them onto the ground. Above the rake teeth there is mounted on the quadrant unit a grill R18. This is of open work structure made up of curved bars R18 spaced apart and depending from a cross piece R19 which is bolted or otherwise secured at R17 to the quadrant plates. The lower ends of the grill bars have a flat cross piece G attached thereto which rests upon the uppermost angle iron member R10 while the lower end of the grill bar reaches down on the front side of the upper angle iron R10. This grill is removable so that access may be had to the interior of the structure for any purpose as may be required. It does not need to be bolted at its lower end, because it is held against movement either towards the right or left as shown in Fig. 1.

A curved baffle plate R20 is located at a point above the grill and serves to direct forwardly the stones which may be thrown in an upward direction by the rapidly traveling lifting arms so that said stones will finally reach the hopper located in front of the conveyor bars and the reel. This baffle plate is of imperforate sheet metal and constitutes a guard against flying stones being immediately thrown up and away from the machine. The baffle plate is welded to side members R14 in the form of plates which are bolted or otherwise secured to the plates forming the quadrant member above described. Any suitable form of screen may be employed extending forward above the said baffle plate to the hopper as a further protection against stones being thrown away from the machine.

Any suitable cover may be used to extend over the springs connecting the several rock shafts to protect these parts against damage.

Substantially the same ground roller and its means of adjustment may be employed as in my Patent 2,141,557 of Dec. 27, 1938.

The side discs 4 of the reel are made of such a smaller diameter in respect to the carrying wheels of the apparatus that said discs will not cut into the ground.

The stone picking arms will enter the ground a sufficient distance, however, to insure good contact with stones that are to be removed. This renders the stone picking act easier, and therefore uses less power.

In order to prevent stones from clogging in the space left between the disc of said reduced diameter and the outside rake teeth a shield consisting of a metal plate sh is welded to the outside of each of the end teeth of the series of rake teeth. This shield will prevent stones from becoming lodged in the space between the reduced diameter discs of the reel and the end teeth of the rake.

Reverting to the action of the bell cranks 44 and springs 46 it will be understood that when any one of the bell cranks 44 moves to cause the associated stone picking arm to trip, tension is built up substantially equally on four of the springs 46, two on each disc of the reel discs 4. The opposite bell cranks will now act as anchors having practically no motion. This mechanism eliminates the stops and shock absorbing means and avoids breakage of the stone lifting arms.

I claim:

1. In apparatus of the class described, a reel carrying four rock shafts journalled thereon and having stone picking arms, said rock shafts being spaced apart at points ninety degrees from each other, bell crank levers mounted on said rock shafts and each bell crank having arms substantially at right angles to each other, helical springs extending each in normal position with its axis coinciding with a line passing through the axial centers of two of the bell crank levers, said springs being connected at their ends to the arms of the bell crank levers, and forming in normal position a substantially quadrangular assembly, said springs restoring the bell crank shafts to and arresting them at said normal position.

2. In combination in stone picking apparatus comprising a reel, stone picking arms carried by the reel, rake teeth cooperating with the stone picking arms for effecting movement of the stones to a point of discharge and shields closing the spaces between the end rake teeth and the reel, against the lodgment or clogging of stones or other obstructions in the path of the stone lifting arms, said shields being substantially fixed relative to the rake teeth, substantially as described.

3. Apparatus for picking stones comprising a reel having a plurality of stone picking arms for lifting the stones from the ground, rock shafts mounted in the reel at points spaced apart from each other about the center of rotation of the reel, said rock shafts each carrying a group of said stone picking arms, lever arms mounted on and extending from each rock shaft in different directions in relation to each other, springs extending between the shafts, anchored to the lever arms of said shafts, and being free from other anchorage on the reel, said springs, shaft ends, and lever arms thereon being arranged in a connected series around the axis of the reel, substantially as described.

4. In stone picking apparatus according to claim 2, said shields being supported on said end rake teeth.

5. In stone picking apparatus, a rotatable reel, a plurality of rock shafts journalled on the reel and circumferentially spaced therearound, stone picking arms carried by each rock shaft, a two armed lever carried by each rock shaft with one arm of each lever directed towards one adjacent rock shaft and the other arm of each lever directed towards another adjacent rock shaft, and a resilient device tensioned in a generally chordal direction between each pair of adjacent arms of the levers.

6. In stone picking apparatus, a rotatable reel including end members, stone picking arms carried by the reel, normally stationary rake teeth terminating adjacent the surface from which stones are to be picked cooperating with the stone picking arms for retaining the stones within the path described by the stone picking arms, and normally stationary shielding means preventing articles from entering a space between one of said rotatable end members and an adjacent rake tooth.

7. In stone picking apparatus, a frame including side frame members, an L-shaped bar having two limbs arranged transversely of said side frame members and at the forward end of the apparatus, a conveyor bar forming a closed loop rearwardly of said transverse bar with the ends of the conveyor bar being substantially straight adjacent said transverse bar and the substantially straight ends being arranged at approximately right angles to each other, means securing one end portion of the conveyor bar in flat engagement with one limb of said L-shaped transverse bar, and means securing the other end portion of the conveyor bar in substantially flat engagement with the other limb of said L-shaped transverse bar.

OTIS F. REITER.